March 14, 1933.  P. P. ADAMS  1,901,276
MOTOR VEHICLE DIFFERENTIAL GEAR DRIVE AND GUIDE IN FOUR WHEELS,
COMBINED WITH TRIPLE DIFFERENTIAL AND BRAKE IN ONE UNIT
Filed Jan. 6, 1930   8 Sheets-Sheet 3

Peter Paul Adams
INVENTOR

BY Victor J. Evans
and Co.
ATTORNEYS

March 14, 1933.  P. P. ADAMS  1,901,276
MOTOR VEHICLE DIFFERENTIAL GEAR DRIVE AND GUIDE IN FOUR WHEELS,
COMBINED WITH TRIPLE DIFFERENTIAL AND BRAKE IN ONE UNIT
Filed Jan. 6, 1930  8 Sheets-Sheet 4

Peter Paul Adams
INVENTOR
BY Victor J. Evans
and Co.  ATTORNEYS

March 14, 1933.   P. P. ADAMS   1,901,276
MOTOR VEHICLE DIFFERENTIAL GEAR DRIVE AND GUIDE IN FOUR WHEELS,
COMBINED WITH TRIPLE DIFFERENTIAL AND BRAKE IN ONE UNIT
Filed Jan. 6, 1930   8 Sheets-Sheet 6

Peter Paul Adams
INVENTOR

BY Victor J. Evans
and Co.   ATTORNEYS

Patented Mar. 14, 1933

1,901,276

UNITED STATES PATENT OFFICE

PETER PAUL ADAMS, OF TURKEY RIVER, IOWA

MOTOR VEHICLE DIFFERENTIAL GEAR DRIVE AND GUIDE IN FOUR WHEELS, COMBINED WITH TRIPLE DIFFERENTIAL AND BRAKE IN ONE UNIT

Application filed January 6, 1930. Serial No. 418,928.

This invention relates to motor vehicle differentials for four-wheel drives and steering mechanism therefor and has for the primary object, the provision of a device of the above stated character which will provide independent differential actions for the front and rear wheels and is provided with means whereby the differential action of either the front or rear wheels may be discontinued when wishing to establish a direct drive to either the front or rear wheels and also whereby the differential action may be discontinued for the purpose of establishing a direct drive to all of the wheels for the purpose of aiding the vehicle in extracting itself from a stalled position due to one or more of the wheels being mired in soft ground.

Another object of this invention is the provision of a differential brake, whereby a braking action may be had to the wheels through the differential.

A further object of this invention is the provision of a steering mechanism for the wheels whereby the front and rear wheels may be steered independently of each other or steered simultaneously, when desired.

A further object of this invention is the provision of means to permit the turning of the wheels to approximately a ninety degree angle to the vehicle so that the parking of the latter in small spaces may be easily accomplished.

A further object of this invention is the provision of brakes for all four wheels which may be effectively applied and will provide the same braking action to the wheels regardless of the angles in which the wheels are positioned.

A further object of this invention is the provision of an improved mounting of the wheels to the axles, so that the wheels may be steered with a minimum effort on the part of the operator and permits the driving and braking actions thereto without affecting the steering.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 20 is a perspective view illustrating the toggle operating member for the brake.

Referring in detail to the drawings the numeral 1 indicates the chassis of a motor vehicle mounted on front and rear axles 2 and 3 supported by ground wheels 4.

Figures 3, 9, 10, 11, 12, 13:
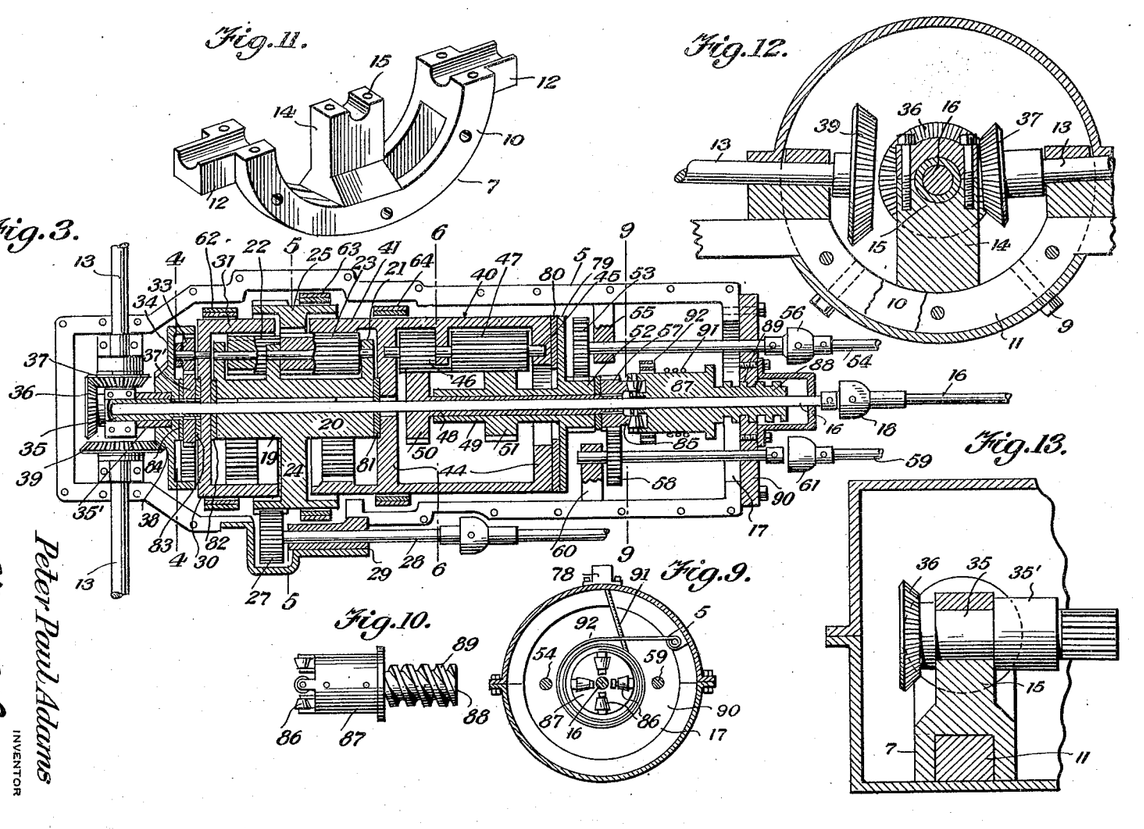
Figure 3 is a horizontal sectional view illustrating the differential.
Figure 9 is a sectional view taken on the line 9—9 of Figure 3.
Figure 10 is a side elevation illustrating the differential actuating drum and feed screw therefor.
Figure 11 is a perspective view illustrating a hanger for the rear axle and rear axle shafts carried by the differential housing.
Figure 12 is a fragmentary transverse sectional view illustrating the same.
Figure 13 is a fragmentary sectional view taken at right angles to Figure 12.
Figures 4, 5, 6, 7, 8:
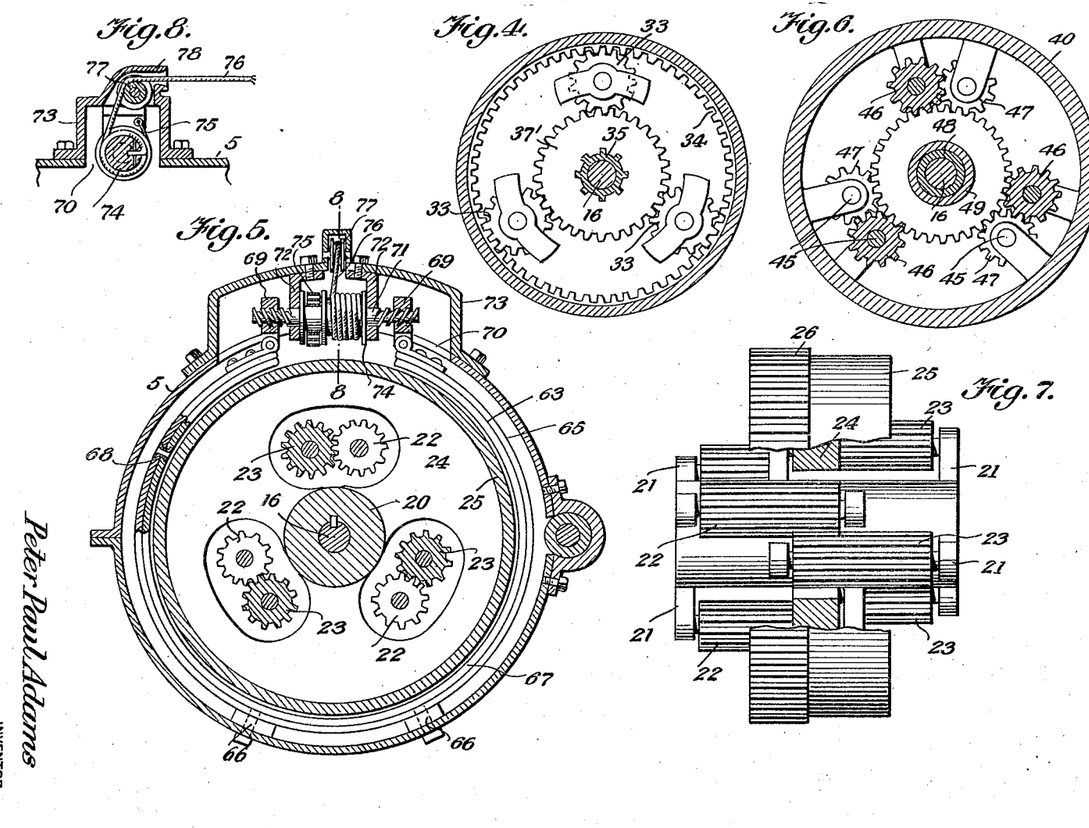
Figure 4 is a sectional view taken on the line 4—4 of Figure 3.
Figure 5 is a sectional view taken on the line 5—5 of Figure 3.
Figure 6 is a sectional view taken on the line 6—6 of Figure 3.
Figure 7 is a fragmentary side elevation illustrating the differential gearing.
Figure 8 is a fragmentary sectional view taken on the line 8—8 of Figure 5.

An elongated sectional differential housing 5 is mounted on the rear portion of the chassis 1 by radius rods 6 and a hanger 7. The radius rods 6 extend forwardly from the housing 5 and are journalled to the side members of the chassis as illustrated at 8 while the hanger 7 is secured to the housing by bolts 9. The hanger 7 includes an arcuate shaped portion 10 of channel formation to receive an arcuate portion 11 of the rear axle 3 and said arcuate shaped portion 11 is secured to the arcuate shaped portion 10 by bolts or like fasteners. Laterally extending bearing portions 12 are formed on the ends of the arcuate shaped portions 10 of the hanger 7 to rotatably support rear power axles 13. Extending upwardly from the arcuate shaped portion 10 intermediate the ends thereof is a standard 14 carrying a bearing 15 for rotatably supporting the rear end of a power or drive shaft 16.

By referring to Figure 3 it will be seen that the power shaft 16 extends through the differential housing 5 by way of an opening 17 in the front wall and is provided with a conventional type of universal joint 18. The forward end of the power or drive shaft 16 is connected to the conventional type of transmission (not shown). The rear power axles 13 are geared to the rear wheels in a manner which will be hereinafter more fully described.

A main drive gear 19 of the differential is splined to the drive of power shaft 16 and is capable of a limited endwise movement relative thereto and includes a hub 20 provided with radially extending arms 21 at each end thereof which rotatably support elongated pinions 22 and 23. The hub 20 is formed intermediate its ends with a flanged portion 24 carrying a peripheral or marginal drum 25. The flanged portion is apertured to receive the shafts which support the pinions 23. A portion of the drum 25 has teeth 26 formed thereon which mesh with a pinion 27 of a power take-off shaft 28 and the latter is journalled in a suitable bearing 29 on the differential housing 5. A driven gear 30 is journalled on the drive shaft 16 adjacent one end of the hub 20 of the drive gear 19 and has an annular flange 31 providing a drum and having formed upon its inner face gear teeth to mesh with the pinions 22. Idle gears 33 are journalled to the driven gear 31 by suitable brackets and mesh with a ring gear 34, which is journalled on a spacing sleeve 35' mounted on a sleeve 35 and the latter is journalled on the power shaft 16 and in the bearing 15 and has secured to the rear end thereof a bevelled gear 36 meshing with a bevelled gear 37 secured to one of the rear power axles 13. A pinion 37' is keyed to the sleeve 35 and meshes with the idle gears 33.

Bevelled gear teeth 38 are formed on the ring gear 34 and mesh with a bevelled gear 39 secured to the other rear power axle 13, thus it will be seen that a differential is provided between the power shaft 16 and the rear power axles 13 which will permit one of the rear wheels to travel faster than the other rear wheel when making a turn and with the power delivered to the wheel.

An elongated tubular driven gear 40 has teeth 41 in mesh with the teeth of the pinions 23. Spaced web portions 44 are formed in the driven gear 40 and are apertured to permit the power shaft 16 to extend therethrough and have journalled thereto shafts 45 carrying elongated pinions 46 and 47. Inner and outer sleeves 48 and 49 are journalled on the power shaft 16 and the sleeve 48 at one end is formed integral with a pinion 50 which meshes with the pinions 46, while the sleeve 49 has a pinion 51 formed thereon that meshes with the pinions 47. A pinion 52 is formed on the sleeve 49 outwardly of the driven gear 40 and meshes with a pinion 53 secured to a front axle power shaft 54 leading to the left front wheel and which is journalled in a suitable bearing 55 and provided with a conventional type of universal joint 56. The forward end of the sleeve 48 has secured thereto a pinion 57 meshing with the gear 58 secured to a front wheel power shaft 59 and the latter is journalled in a bearing 60. The shaft 59 is equipped with the conventional type of universal joint 61 and is employed for driving the front right wheel of the vehicle. From the foregoing description it will be noted that differentials have been provided for the front and rear wheels capable of independent operations.

Brakes 62, 63 and 64 are mounted on the driven gear 31, brake drum 25 of the drive gear 19 and the driven gear 40 and said brakes are constructed alike and reference to one specifically is thought to answer for all.

The differential brake includes a band 65 of the split type mounted to the differential housing as shown at 66 and carries a suitable lining 67 which is secured thereto by hollow rivets 68 for the purpose of permitting lubricant to flow through the band and lining thereof. Upstanding ears 69 are pivoted to the ends of the band 65 and extend through a slot 70 in the top wall of the differential housing and are provided with right and left screw-threads to mesh with the left and right hand screw-threads of an operating shaft 71 journalled in suitable brackets 72 carried by a removable cover 73 mounted on the differential housing by bolts or like fasteners. A drum 74 is secured to the shaft 71 between the brackets 72 and has mounted on a portion thereof a spring 75, one end of which is secured to the drum while the other end is secured to the cover 73. When the drum is rotatable in one direction, the spring 75 is tensioned so that when the drum is released it will be automatically rotated in an opposite direction. An operating cable 76 is secured to the drum and wound thereon and fed off the drum over a guide pulley 77 for the purpose of manually rotating the drum 74 in one direction to contract the band and when released the spring 75 is adapted to rotate the drum in an opposite drection for expanding the band 65.

The cover 73 is provided with an offset neck 78 in which is journalled the guide felly 71 and permits the operating cable 76 to extend outwardly of the differential housing for connection with an operating medium that will be hereinafter more fully described.

The brake 62 when applied to the driven gear 31 discontinues drive power to the rear wheels without interfering with the differential action between said rear wheels. The applying of the brake 64 discontinues drive power to the front wheels without interfering with the differential action between said front wheels. The application of the brake 63 with the brakes 62 and 64 released will permit braking action to be applied to the front and rear wheels through the differential.

From the foregoing description taken in connection with Figure 3 of the drawings, it will be seen that the following gears provide the differential for the rear wheels. The drive gear 19 is rotated by the power shaft 16 and the driven gear 30 is rotated by the drive gear 19 through the pinions 22 and the driven gear 30 carries idle gears 33 which mesh with the ring gear 34 and the gear 37' secured to the sleeve 35. The ring gear 34 being provided with teeth 38 which mesh with the gear 39 secured to one of the rear axles while the sleeve 35 is connected to the other rear axle by the gears 36 and 37 respectively. The foregoing gears in mesh with each other as described provides a differential between the rear axles of the rear wheels and when it is desired to discontinue the differential action, the brake 62 is applied to the drum 31 of the driven gear 30. The differential for the front wheels is provided by the driven gear 40 connected to the drive gear 19 by the pinions 23. The inner and outer sleeves 48 and 49 being connected to the driven gear 40 by the pinions 46 and 47 meshing with the gears 50 and 51 respectively. The drive shafts of the front wheels being connected to the inner and outer sleeves 48 and 49 by the gears 53 and 58. The gears thus meshing with each other provide the front differential for the front wheels and by applying the brake 64 to the periphery of the driven gear 40, the front differential action may be destroyed. When it is desired to destroy the differential action to the front and rear wheels simultaneously and provide a positive drive to each wheel, the brake mechanism 87 is actuated.

During the application of the brake 62, drive to the rear wheels is stopped, still permitting differential movement between the rear wheels or axles, strictly for turning movement of the vehicle without forward or rearward movement thereto. The same action occurs to the front wheels when the brake 64 is applied.

A plate 79 is formed on the front sleeve 49 and provided with a lining 80 to engage one end of the driven gear 40. A composition disk 81 is interposed between one end of the drive gear 19 and the web portion 44 of the driven gear 40. A similar disk 83 is interposed between the driven gear 31 and the pinion 37' and a disk 84 is interposed between the pinion 37' and the ring gear 34. The ring gear 34 is limited in an endwise movement in one direction by the spacing sleeve 35'. A bearing face 85 is formed on the pinion 57 and is engaged by anti-friction rollers 86 journalled to the end of a drum 87 which is mounted for free rotation on the power shaft 16 and has formed on its opposite end a shank 88 provided with feed threads 89 meshing with corresponding threads formed in the walls of an opening of a closure plate 90 which is detachably secured to the forward end of the differential housing 5 so that the rotation of the drum 87 in one direction will cause said drum to move forwardly and relieve pressure on the bearing face 85 of the pinion 57 and a reverse rotation of the drum will cause a pressure to be exerted on the pinion 57 which shifts the sleeve 49 endwise bringing the lining 80 of the plate 79 against the driven gear 40. The pressure on the driven gear 40 moves the same endwise exerting pressure on the drive gear 19 and the latter exerts pressure on the driven gear 31 and the latter exerts pressure on the ring gear 34 which in turn binds against the spacing sleeve 35'. The parts thus shifted endwise lock the differential parts together so as to destroy the differential action on all four wheels and permitting a direct drive to be established between all four wheels and the drive shaft 16.

A cable 91 is secured to the drum 87 and wound several times thereon and passed out of the differential housing by way of one of the laterally disposed necks 78. A spring 92 has one end secured to the drum 87 and its other end secured to the differential housing so that when the cable 91 is pulled upon to rotate the drum in one direction, the spring will be tensioned and when the cable is released, said spring rotates the drum in a reverse direction.

The operating cable 76 of the brake 63 is connected to an arm 93 on a transversely arranged shaft 94 journalled to the chassis 1 and which is provided with a brake lever 95 to permit the operator to apply the brake 63 with ease.

Figure 16:
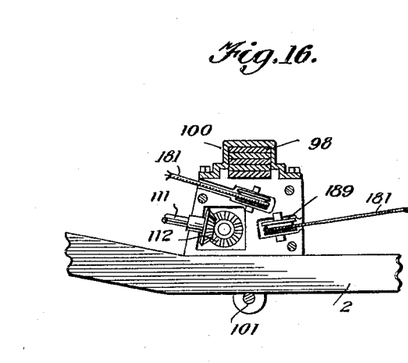
Figure 16 is a fragmentary sectional view illustrating the mounting of one of the springs to the axle.
Figure 17:
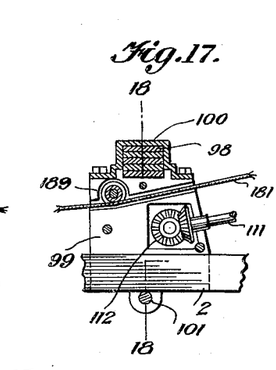
Figure 17 is a similar view illustrating the mounting of the adjacent spring to the axle.
Figure 18:
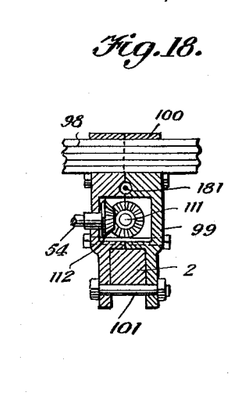
Figure 18 is a sectional view taken on the line 18—18 of Figure 17.

The rear axle 3 is attached to the chassis 1 through springs 96 mounted on said axle as shown at 97. The front end of the chassis is mounted on the front axle 2 by springs 98 secured to gear housings 99 by clamps 100 and the gear housings that are secured to the axles 2 as shown at 101.

Figures 14, 19, 21, 22, 23:
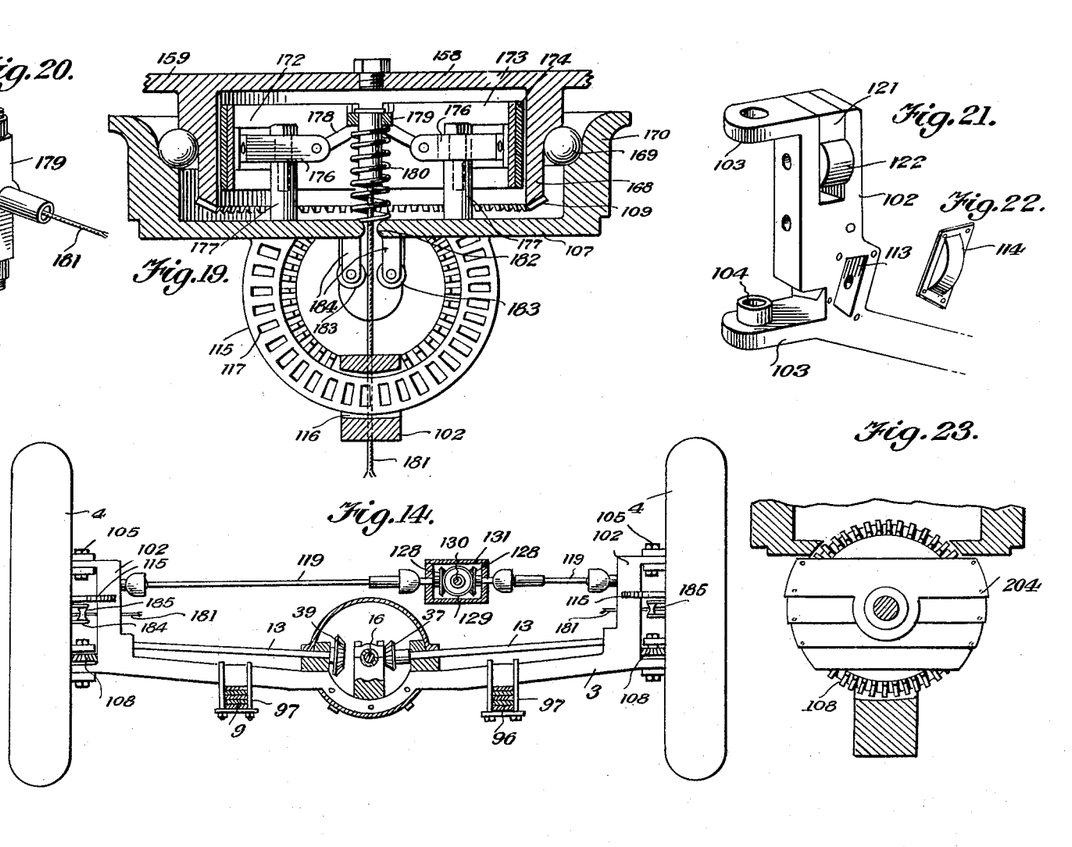
Figure 14 is a transverse sectional view illustrating the rear axle and the differential and steering mechanism associated therewith.
Figure 19 is a fragmentary sectional view drawn on an enlarged scale illustrating the brake and a portion of the steering means for one of the wheels.
Figure 21 is a fragmentary perspective view illustrating one of the ends of one of the axles.
Figure 22 is a perspective view illustrating a cover for said end of the axle.
Figure 23 is a fragmentary sectional view illustrating a telescopic housing which may be employed in conjunction with the portion of the steering means carried by the axle.
Figure 15:
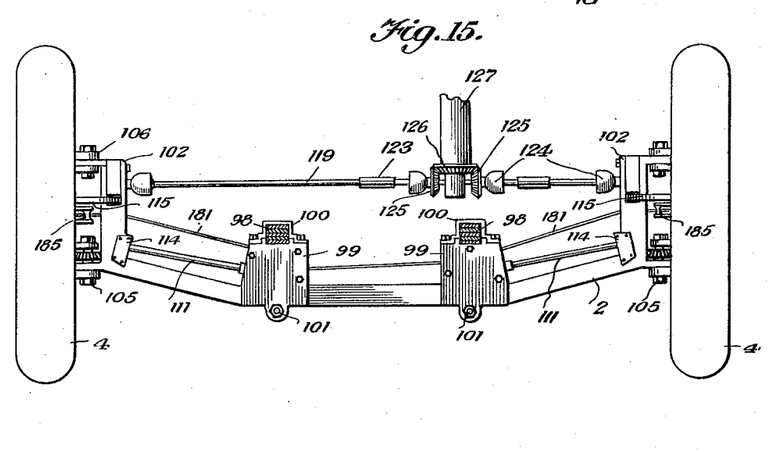
Figure 15 is a similar view illustrating the front axle with the drive and steering mechanism associated therewith.

The ends of the axles 2 and 3 have heads 102 formed thereon and which are provided with laterally extending arms 103 provided with bearing openings 104 to receive spindle bolts 105 carried by spaced ears 106 of stub axles 107 on which the wheels are journalled. Pinions 108 are journalled to the heads 102 of the axles and mesh with ring gears 109 forming parts of the hubs of the wheels and also mesh with pinions 110. The pinions 110 of the rear axle are secured to the power axles 13 while the pinions 110 associated with the front axle are secured to front power axles 111 which have their inner ends journalled in bearings formed in the gear housings 99 and provided with gears 112 secured to the forward ends of the shafts 54 and 59 of the differential; thus it will be seen that the driven shaft 16 may drive all four wheels through the differential in a manner heretofore described. The heads 102 are provided with recesses 113 to receive the pinions 110 and which are closed by removable covers 114.

Segmental shaped plates 115 are secured to the stub axles 107 and operate through slots 116 in the heads 102 and have formed therein a plurality of slots forming therebetween teeth 117 to mesh with pinions 118 secured to steering shafts 119. The pinions 118 operate in slots 120 which open outwardly through the sides and upper ends of the heads 102 and are closed by substantially U-shaped members 121 which are removably secured to the heads 102 by bolts or like fasteners and are provided with hollow offset portions 122 to receive and permit free rotation of the pinions or gears 118.

The steering shafts 119 associated with the front axle 2 are of the sectional type slidably connected by suitable couplings 123 and also are provided with conventional types of universal joints 124 to compensate for the difference in movements between the running gear of the vehicle and the steering mechanism. The inner ends of the steering shafts 119 of the front axle 2 are provided with gears 125 meshing with a gear 126 of a steering mechanism 127.

The steering shafts 119 associated with the rear axle 3 are of a similar construction with the steering shafts associated with the front axle and the gears 128 secured to their opposing ends mesh with a gear 129 secured to a shaft 130 that extends forwardly of the chassis to the steering mechanism 127. The gears 128 and 129 are mounted in a suitable gear housing 131 mounted on the chassis 1.

Figures 28, 29, 30, 31, 32:
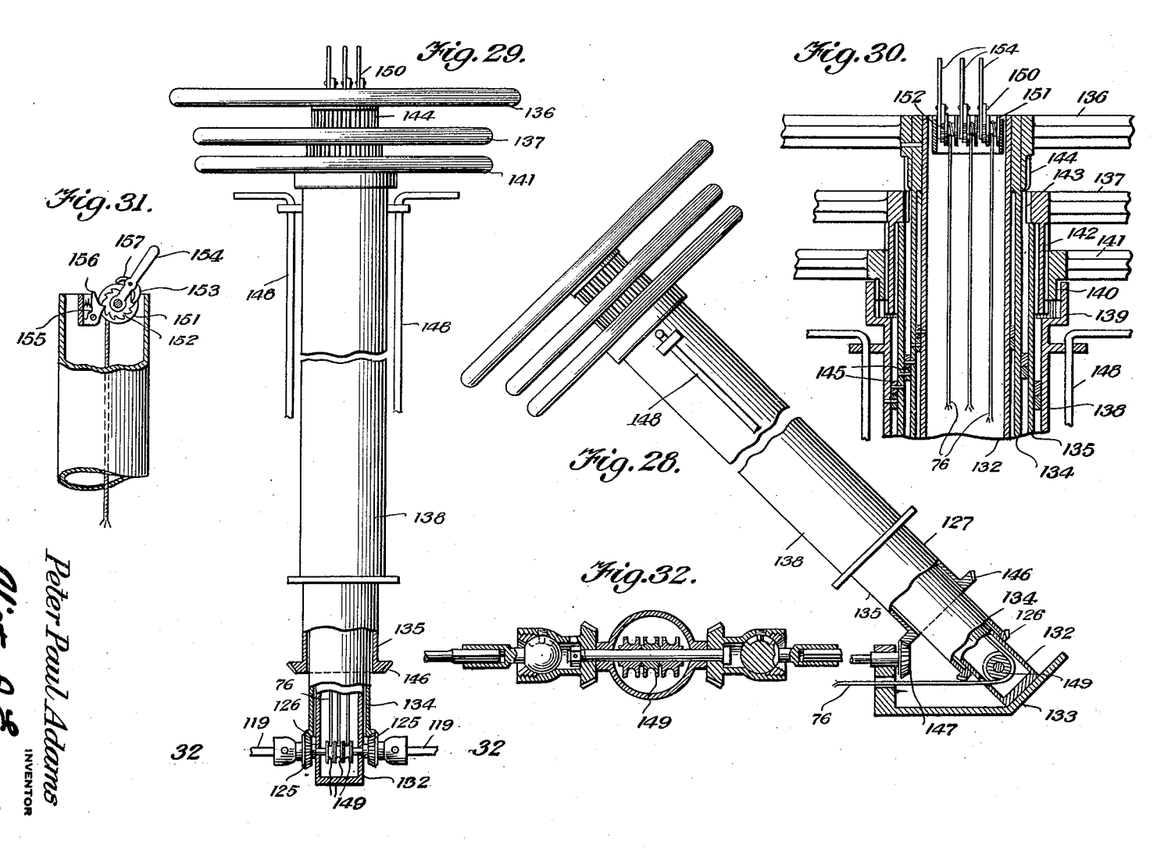
Figure 28 is a side elevation partly in section illustrating the steering post and steering wheels associated therewith.
Figure 29 is a plan view partly in section illustrating the steering mechanism.
Figure 30 is a fragmentary sectional view illustrating the means of locking the steering wheels together.
Figure 31 is a fragmentary sectional view illustrating the mounting of a brake operating means with the steering mechanism.
Figure 32 is a sectional view taken on the line 32—32 of Figure 29.

The steering mechanism 127 includes a hollow supporting post 132 mounted on a suitable bracket 133 carried by the chassis 1 and the post 132 has superimposed sleeves 134 and 135 mounted thereon carrying at their upper ends steering wheels 136 and 137. The steering wheel 136 is fixed to the sleeve 134 while the steering wheel 137 is splined to the sleeve 135 and capable of a limited endwise movement relative thereto. A column sleeve 138 surrounds the major portion of the sleeve 135 and has its upper end enlarged to form an internal gear 139 to mesh with the teeth 140 formed on a locking wheel 141, the hub of which is splined to the hub 142 of the steering wheel 137. The hub 142 of the steering wheel 137 has formed thereon teeth 143 adapted to mesh with teeth 144 on the hub of the steering wheel 136 when the steering wheels 137 and 136 are moved toward each other and to be disconnected when said steering wheels are moved away from each other. The column sleeve 138 is rigidly mounted while the sleeves 134 and 135 are mounted for free rotation and are limited in endwise movements by collars 145. The lower end of the sleeve 135 is connected to the shaft 130 by gears 146 and 147 while the lower end of the sleeve 134 has the gear 126 secured thereto which meshes with the gears 125 of the front steering shafts 119.

With the steering wheel 137 locked to the locking wheel 141 and the latter locked to the column 138, the vehicle can be steered by the front wheels in the ordinary manner by operating the steering wheel 136. Should it be desired to steer the rear wheels with the front wheels the steering wheel 127 is moved toward the steering wheel 136 locking the hubs thereof together and at the same time the locking wheel 141 is disengaged from the gear 140 of the column 138 and the steering wheels are then turned as a single unit in the ordinary way. Should it be desired to steer the rear wheels independent of the front wheels, the steering wheel 137 is disengaged from the steering wheel 136 and the locking wheel 141 is disconnected from the gear 139 of the column 138, thus it will be seen that the vehicle can be steered either by the front wheels or by the rear wheels or all four wheels simultaneously. The steering wheels 136 and 137 and the locking wheel 141 are so closely related that the driver can grip the three wheels simultaneously when desired.

The usual spark and gas throttles 148 may be mounted at the sides of the column 138 in close proximity to the steering wheels as usual.

The plurality of grooved pulleys 149 are journalled in the lower end of the supporting post 132 and have the cables 76 of the brakes of the differential trained thereover and extend upwardly through said supporting post 132 to operating means 150 located above the steering wheel 136. Each cable is provided with an operating means 150 and each means includes a drum 151 rotatably supported in the post and has the end of the respective cable connected thereto. A ratchet wheel 152 is secured to the drum and is engaged by a pivoted pawl 153 carried by an operating lever 154 journalled to the mounting of the drum. A holding dog 155 is pivotally supported and normally urged into engagement with the ratchet wheel for preventing the drum from rotating in one direction by the influence of the tension of the cable thereon. The pivoted dog 155 is spring pressed and provided with an extension 156 adapted to be engaged by an extension 157 on the pivoted dog 153 when the lever 154 is swung to the limit of its movement in one direction for the purpose of freeing the drum and permitting the brake connected to the respective cable to be freed by the spring thereof. It will be seen by oscillating the lever 154 without engaging the extension 157 of the pawl 153 with the extension 156 of the holding dog 155, the drum 151 may be rotated in a proper direction to wind the cable thereon for the purpose of applying the respective brake attached thereto.

Figure 25:
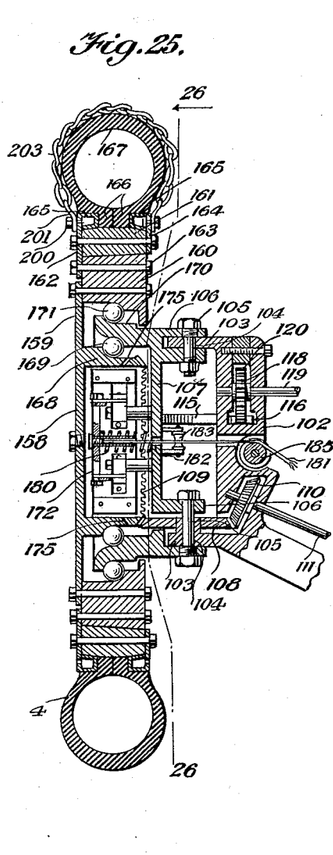
Figure 25 is a sectional view illustrating the mounting of one of the wheels to the axle and the drive and brake means for said wheel.

The construction of each wheel is identical and reference to one is thought sufficient for all and each wheel comprises a hub portion 158 carrying an integral flange portion 159 to which a felly 160 is secured and the felly has mounted thereon a rim 161. The felly and rim provided with bevelled faces adapted to have wedging action in one direction for aiding in retaining the rim on the felly. An attaching ring 162 is detachably secured to one face of both the felly and rim by bolts 163 providing means whereby the rim may be removed from the felly when desired. The opposite face of the rim has secured thereon a ring or plate 164. The rings or plates 162 and 164 have inwardly extending tire engaging flanges 165 adapted to grip the beads 166 of a pneumatic tire 167. The tire is firmly secured on the rim 161 by the flanges 165 engaging the beads 166 and pressing said beads together with such force that a leak-proof connection is established between the beads thereby permitting the tire to be inflated without the employment of the usual inner tube.

The hub portion 158 has formed thereon an internal drum 168 which has the ring gear 109 formed integral therewith and the front face of the drum is provided with a raceway to receive ball bearings 169 that engage a raceway formed on the inner face of a bearing flange 170 formed integral with the stub axle 107. The bearing flange 170 on its outer face has formed therein a raceway receiving ball bearings 171 that engage a raceway formed on the inner face of the felly 160, thus it will be seen that the wheel is mounted upon the stub axle 107 for free rotation relative thereto with a minimum amount of friction and also due to the construction of the wheel and stub axle the wheel can be swung into substantial parallelism with the axle when it is desired to move the vehicle sidewise.

Each wheel is provided with a brake mechanism 172 and includes a brake band 173 having a brake lining 174 to engage the inner face of the drum 168 and the latter is provided with a plurality of lubricant passages 175 to permit lubricant to enter the interior of the brake drum and also to pass therefrom back to the ball bearings 169 and 171. The brake band 174 is of the sectional shoe type as clearly shown in Figure 26 and the sections thereof have blocks 176 secured thereto which are slidably mounted on pins 177 carried by the suitable axle 107. Links 178 are pivoted to the blocks 176 and to the ends of a T-shaped operating member 179 which is clearly shown in Figure 20 and is yieldably supported by a coiled spring 180. The action of the spring is to urge the operating member 179 in a direction to disengage the brake band 173 from the drum and the operating member has connected thereto an operating cable 181 extending through an opening 182 in a stub axle 107 and passes between guide rollers 183 journalled to suitable brackets 184 carried by a suitable axle and which are located relative to the pivot of the stub axle with the wheel that the wheel may be positioned approximately in parallelism with the axle without tensioning or affecting the operating cable 181. The operating cable 181 also is trained over a guide pulley 185 in the head 102 of the axle.

Th operating cables 181 of the rear wheel brakes are connected together or may be a single cable with its ends connected to the operating members 179 of the rear wheel brakes and the cable 181 is trained over a series of pulleys 186 supported by the differential housing and also over a pulley 187 forming part of a brake equalizer 188.

Figure 1:
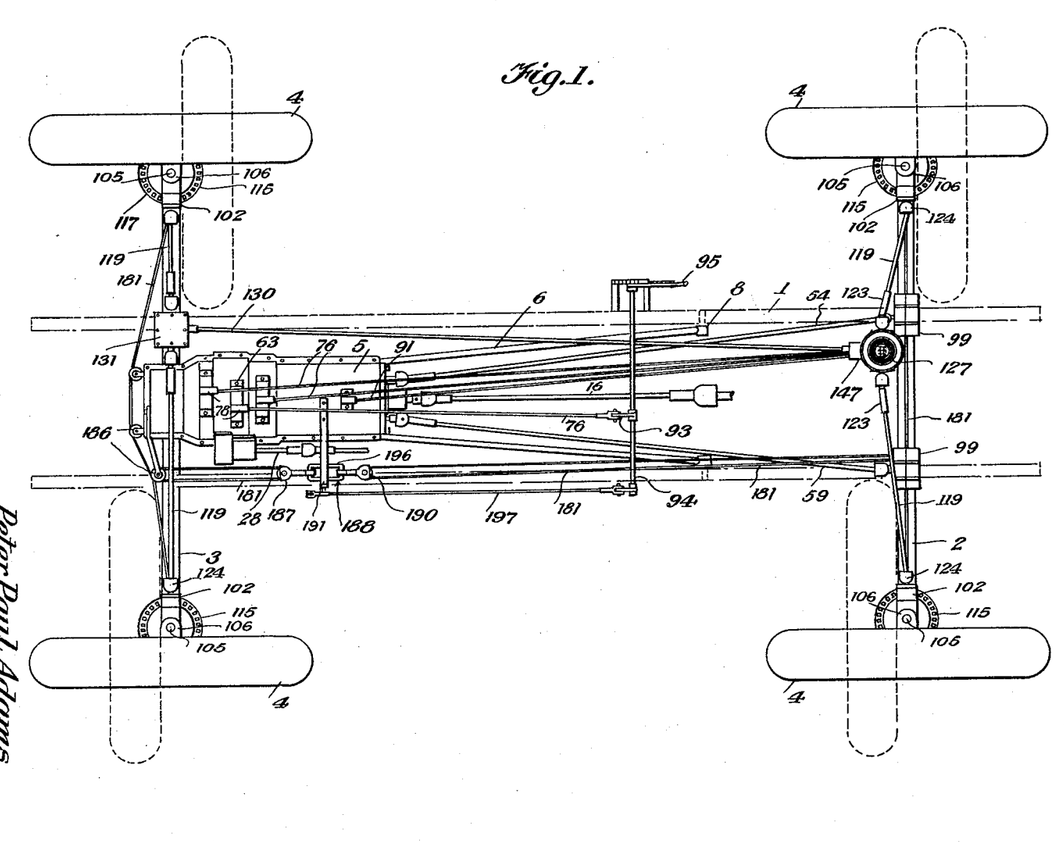
Figure 1 is a plan view illustrating a motor vehicle drive and steering mechanism therefor and constructed in accordance with my invention.
Figures 2, 24:
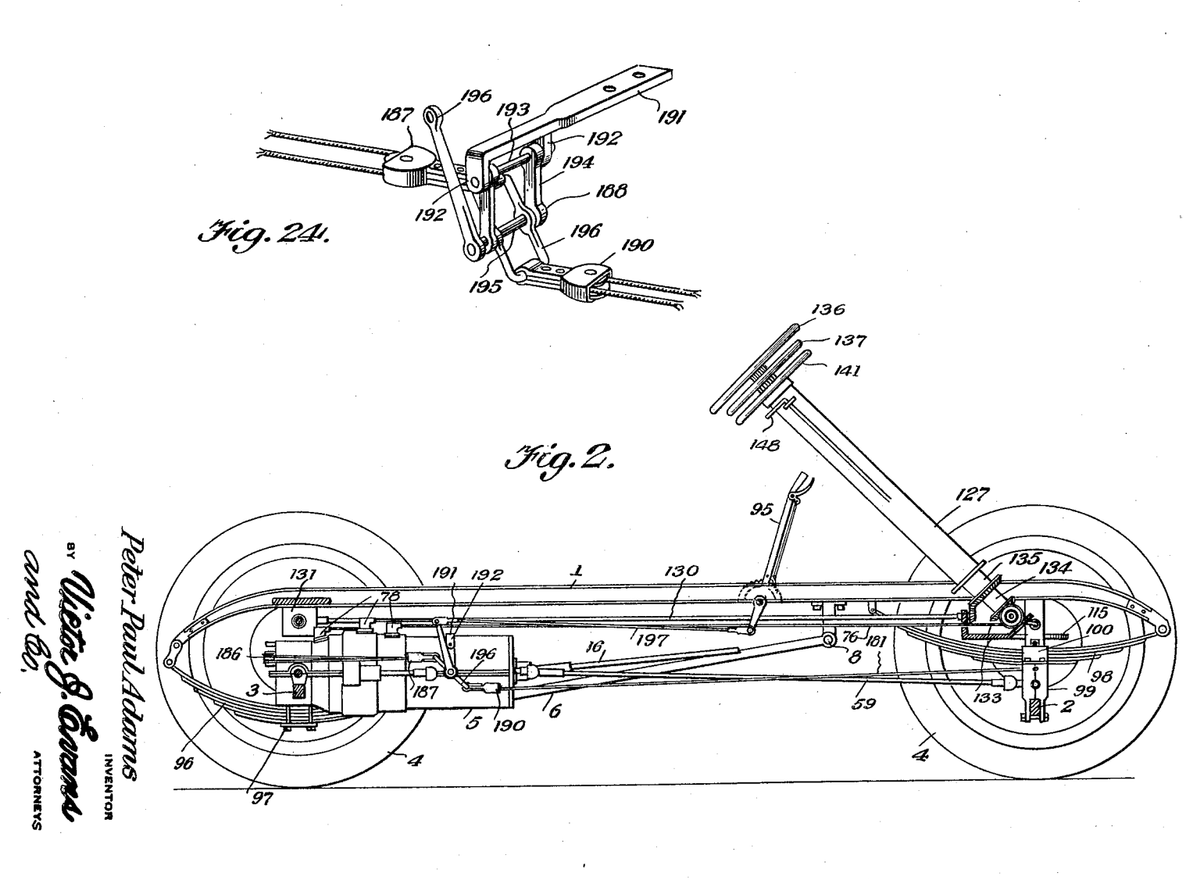
Figure 2 is a longitudinal sectional view illustrating the same.
Figure 24 is a fragmentary perspective view illustrating a brake equalizer.

The operating cable 181 of the brakes of the front wheels are passed over a series of pulleys 189 on the gear housings 99 that support the front springs to the axle 2 and also is trained over a pulley 190 of the equalizer 188. The equalizer 188 includes a bracket 191 secured to the differential housing and is provided with spaced ears 192 carrying a bolt 193 to which a hanger 194 is secured. The hanger 194 includes spaced arms connected together by a shaft 195 on which is secured a rectangular shaped frame 196 carrying the pulleys 187 and 190. The shaft 195 is journaled in the arms 194 and carries an arm 196 which is in turn connected to the shaft 94 of the brake 95 by a rod 197 whereby the operation of the brake lever of four brakes will be actuated.

Figures 26, 27:
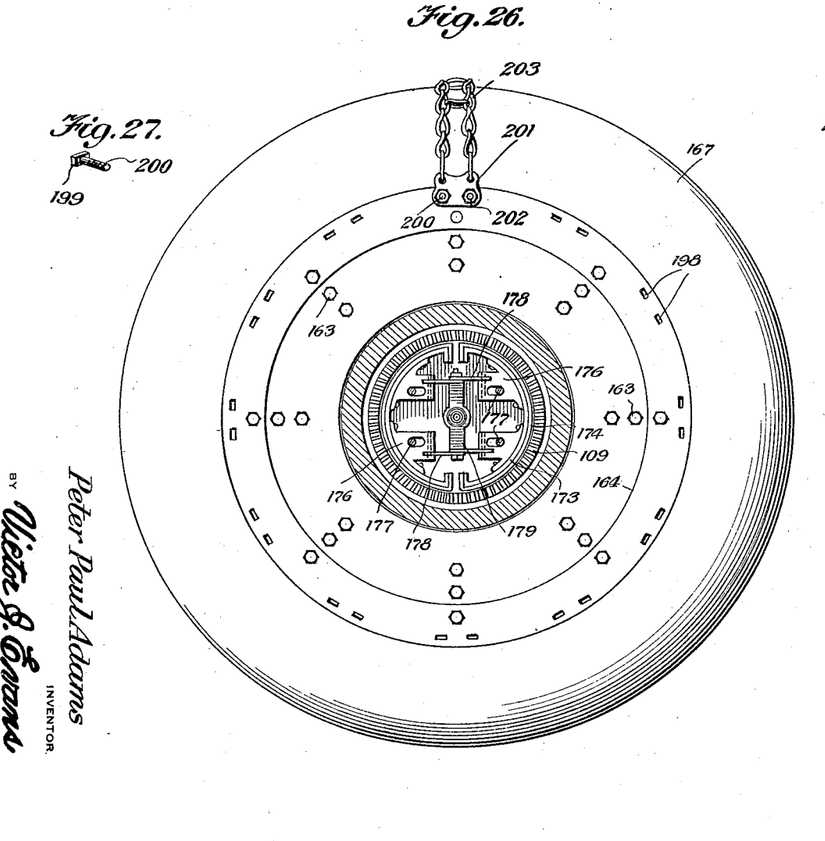
Figure 26 is a sectional view taken on the line 26—26 of Figure 25.
Figure 27 is a perspective view illustrating a bolt for securing the anti-skid chain to the tire.

The plates or rings 162 and 164 are provided with pairs of elongated slots 198 to receive elongated heads 199 of bolts 200 that have mounted thereon chain attaching plates 201. The plates are retained on the bolts by nuts 202 and the plates are connected in pairs by anti-skid chains 203 extending transversely of the tire. When it is desired to remove anti-skid chains from the tire the nuts are removed and the bolts turned so that their elongated heads are moved through the elongated slots 198.

The stub axle, heads 102 of the front and rear axles, and the gear associated therewith may be protected by covers 204 as shown in Figure 23 and each of these covers is constructed from a plurality of telescopic sections whereby the sections may slide relative to each other for permitting the stub axles and wheels to turn freely relative to the axles.

While I have shown and described the preferred embodiment of my invention, it will be understood that minor changes in construction, combination and arrangement of parts may be made without departing from the spirit and scope of the invention, as claimed.

Having thus described my invention, what I claim is:

1. A differential comprising a housing, a drive shaft journalled in said housing, a drive gear secured to said shaft, pinions journalled to said gear, driven gears meshing with said pinions, pinions journalled to said driven gears, power delivering gears in mesh with the second named pinions, front and rear power axles connected with said power delivering gears, brakes for holding either of the driven gears against rotation, and a braking means whereby the driven gears may be simultaneously held against rotation.

2. A differential comprising a housing, a drive shaft in said housing, a drive gear secured to said shaft, pinions journalled to said gear, driven gears meshing with said pinions, pinions journalled to said driven gears, power delivering gears in mesh with the second named gears, front and rear power axles connected with the power delivering gears, brakes for said driven gears, a stop sleeve to engage one of the power delivering gears, a brake face on the other power delivering gear, a drum journalled on the drive shaft, anti-friction means between the drum and the brake face, tension means connected to the drum and housing, a shank on the drum and having feed threads, plates having feed threads engaging the feed threads of the shank and secured to the housing, and a manually actuated cable secured to the drum for rotating the latter in one direction to cause locking of both of the driven gears and to manually release said spring to adapt it to rotate the drum in a reverse direction to free the driven gears.

3. A differential comprising a housing, a drive shaft extending into said housing, a drive gear secured to said shaft, a driven gear journalled on the shaft, pinions journalled to the drive gear and in mesh with the driven gear, power axles extending into said housing, idle pinions carried by the driven pinions, a ring gear meshing with the idle pinions, a gear journalled on the shaft and meshing with the idle pinion, a sleeve secured to the last named gear, means connecting said sleeve to one of the power axles, and means connecting the other power axle with the ring gear.

4. A differential comprising a housing, a drive shaft extending into said housing, power axles extending into said housing, a differential between the power axles and the drive shaft, a brake face on the differential, a brake band to engage the brake face, brackets secured to the housing, a shaft journalled in said brackets and having right and left screw-threads, screw threaded ears pivoted to the brake bands and receiving the shaft, a drum secured to said shaft, a spring attached to the drum and to the housing, a cable wound on said drum and having one end secured thereto and its other end connected to an operating means for rotating the drum in one direction to apply the brake band to the brake face and when said drum is released of tension by the cable and adapted to be rotated in a reverse direction by the spring for disengaging the band from the brake surface.

5. A differential comprising a housing, a drive shaft extending into said housing, an arcuate shaped hanger mounted in the housing, bearings carried by said hanger, power axles journalled in said bearings and a differential between the power axle and the drive shaft.

6. A differential comprising a housing, a drive shaft extending into said housing, power axles extending into said housings, an arcuate shaped hanger mounted in said housing and having a grooved portion to receive the rear axle of a vehicle, means securing the hanger to the axle, a differential between the power axles and the drive shaft, bearings on said hanger supporting the power axles, a standard on the hanger, and a bearing carried by the standard to support one end of the drive shaft.

In testimony whereof I affix my signature.

PETER PAUL ADAMS.